United States Patent
Lutz et al.

(10) Patent No.: US 9,582,248 B2
(45) Date of Patent: Feb. 28, 2017

(54) STANDALONE FLOATING-POINT CONVERSION UNIT

(71) Applicant: ARM Limited, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 207 days.

(21) Appl. No.: 14/498,172

(22) Filed: Sep. 26, 2014

(65) Prior Publication Data

US 2016/0092169 A1    Mar. 31, 2016

(51) Int. Cl.
*G06F 5/01* (2006.01)
*G06F 7/485* (2006.01)

(52) U.S. Cl.
CPC ................................... *G06F 7/485* (2013.01)

(58) Field of Classification Search
None
See application file for complete search history.

(56) References Cited

U.S. PATENT DOCUMENTS

| | | |
|---|---|---|
| 3,930,232 A | 12/1975 | Wallach et al. |
| 6,249,798 B1 | 6/2001 | Golliver et al. |
| 7,401,107 B2 | 7/2008 | Lutz et al. |
| 7,774,393 B1 * | 8/2010 | Brooks ............... H03M 7/24 708/204 |
| 2011/0279692 A1 | 11/2011 | Hirayama |
| 2012/0215822 A1 * | 8/2012 | Nystad ................ G06F 7/483 708/204 |
| 2016/0092168 A1 * | 3/2016 | Lutz .................... G06F 5/00 708/204 |
| 2016/0092169 A1 * | 3/2016 | Lutz .................... G06F 7/485 708/205 |

OTHER PUBLICATIONS

UK Combined Search and Examination Report dated Mar. 9, 2016 issued in GB 1513897.7, 6 pages.
"IEEE Standard for Floating-Point Arithmetic" IEEE Computer Society, IEEE Std 754™—2008, Aug. 2008, 70 pages.
U.S. Appl. No. 14/498,118, filed Sep. 26, 2014, Lutz et al.
Office Action mailed Jul. 29, 2016 in co-pending U.S. Appl. No. 14/498,118 9 pages.
UK Examination Report dated Oct. 7, 2016 issued in GB 1513897.7, 3 pages.

* cited by examiner

*Primary Examiner* — David H Malzahn
(74) *Attorney, Agent, or Firm* — Nixon & Vanderhye P.C.

(57) ABSTRACT

A data processing apparatus includes floating-point adder circuitry and floating-point conversion circuitry that generates a floating-point number as an output by performing a conversion on any input having a format from a list of formats including: an integer number, a fixed-point number, and a floating-point number having a format smaller than the output floating-point number. The floating-point conversion circuitry is physically distinct from the floating-point adder circuitry.

16 Claims, 7 Drawing Sheets

STANDALONE FLOATING-POINT CONVERSION UNIT

BACKGROUND

The present disclosure is concerned with the field of data processing.

In a data processing apparatus, numbers can be represented in one of several different formats. For example, the 32-bit integer format uses 32 bits to represent a whole number in binary. A further example is the 64-bit integer format, which uses 64 bits to represent a whole number in binary. The increased number of bits used in the 64-bit format can allow much greater range of values to be represented than may be possible with the 32-bit integer format.

Another example format is a floating-point number. A floating-point number can be used to represent any real number rather than simply any integer. As in the case with integer formats, increasing the number of bits used to represent the floating-point number typically increases the range of values that can be represented. Additionally, increasing the number of bits used to represent a floating-point number may increase the accuracy with which a number can be represented.

Often, in a data processing apparatus, it is desirable to be able to convert from numerous different formats to floating-point formats. For example, if a programmer wishes to add an integer to a fractional number, one approach is for the integer to first be converted to a floating-point number. Alternatively, it may be desirable to increase the number of bits used to represent a floating-point number if more precision is required and in this situation an input floating-point number represented by fewer bits provides the input format.

It would be desirable to allow a direct conversion between multiple different formats, since this may decrease the latency as a consequence of converting to intermediate formats, which would necessitate two or more conversions. However, circuitry that handles multiple direct conversions is typically more complicated, and therefore requires more space, than circuitry that supports few direct conversions. Bigger circuits can lead to bigger devices with higher power consumptions, which can be undesirable in low power devices.

SUMMARY

In accordance with one aspect, there is provided data processing apparatus comprising: floating-point adder circuitry; and floating-point conversion circuitry to generate a floating-point number as an output by performing a conversion on any input having a format from a list of formats including: an integer number, a fixed-point number, and a floating-point number having a format smaller than the output floating-point number, wherein the floating-point conversion circuitry is physically distinct from the floating-point adder circuitry.

According to a second aspect, there is provided a method of operating a data processing apparatus comprising floating-point adder circuitry and floating point conversion circuitry, wherein said floating-point conversion circuitry is physically distinct from said floating-point adder circuitry, said method comprising the steps, performed by the data processing apparatus, of: receiving any input having a format from a list of formats including: an integer number, a fixed-point number, and a floating-point number having a format smaller than said output floating-point number; and generating a floating-point number as an output by performing a conversion on the input.

According to a third aspect, there is provided a data processing apparatus comprising: means for performing floating-point addition; and means for performing floating-point conversion, said means for performing floating-point conversion to generate a floating-point number as an output by performing a conversion on any input having a format from a list of formats including: an integer number, a fixed-point number, and a floating-point number having a format smaller than said output floating-point number, wherein said means for performing floating-point conversion is physically distinct from said means for performing floating-point addition.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Floating-point (FP) is a useful way of approximating real numbers using a small number of bits. The IEEE 754-2008 floating-point standard proposes multiple different formats for floating-point numbers. Examples include binary 64 (also known as double precision, or DP), binary 32 (also known as single precision, or SP), and binary 16 (also known as half precision, or HP). The numbers 64, 32, and 16 refer to the number of bits required for each format.

Floating-point numbers are quite similar to the "scientific notation" taught in science classes, where instead of negative two million, it is possible to write $-2.0 \times 10^6$. The parts of this number are the sign (in this case negative), the significand (2.0), the base of the exponent (10), and the exponent (6). All of these parts have analogs in floating-point numbers, although there are differences, the most important of which is that the constituent parts are stored as binary numbers, and the base of the exponent is always 2. Floating-point numbers generally consist of a sign bit, some number of biased exponent bits, and some number of fraction bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above. SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format". NaNs are returned for operations that are not mathematically defined on the real numbers, for example division by zero or taking the square root of a negative number.

Exponent zero, in any of the formats, is reserved for subnormal numbers and zeros. A normal number represents the value: $sign \times 1.fraction \times 2^e$ where e is the true exponent computed from the biased exponent. The term 1.fraction is called the significand, and the 1 is not stored as part of the floating-point number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros. The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of floating-point implementation is due to subnormals, therefore they are often handled by microcode or software.

The way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n + i$, so a 4-bit two's complement integer would represent plus and minus one as:

+1=0001

−1=1111

The two's complement format is practically universal for signed integers because it simplifies computer arithmetic.

A fixed-point number may look similar to or even the same as an integer, but it actually represents a value that has a certain number of fractional bits. Sensor data is often in fixed-point format. With fixed-point numbers, a programmer often has to keep track of the "binary point", i.e. the separator between the integer and fractional parts of the number, and also has to constantly shift the number to keep the bits in the correct place.

Most floating-point operations are required by the IEEE-754 standard to be computed as if the operation were done with unbounded range and precision, and then rounded to fit into a floating-point number. If the computation exactly matches a floating-point number, then that value is always returned, but usually the computation results in a value that lies between two consecutive floating-point numbers. Rounding is the process of picking which of the two consecutive numbers should be returned.

There are a number of ways of rounding, called rounding modes; six examples of these are:

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

One common implementation is to do the operation, look at the truncated value (i.e. the value that fits into the floating-point format) as well as all of the remaining bits, and then adjust the truncated value if certain conditions hold. These computations are all based on three values:

L—(least) the least significant bit of the truncated value

G—(guard) the next most significant bit (i.e. the first bit not included in the truncation)

S—(sticky) the logical OR of all remaining bits that are not part of the truncation Given these three values and the truncated value, we can compute the correctly rounded value according to the following table:

| mode | change to the truncated value |
|------|-------------------------------|
| RNE  | increment if (L&G)\|(G&S)     |
| RNA  | increment if G                |
| RZ   | none                          |
| RP   | increment if positive & (G\|S)|
| RM   | increment if negative & (G\|S)|
| RX   | set L if G\|S                 |

For example, consider multiplying two 4-bit significands, and then rounding to a 4-bit significand.

sig1=1011 (decimal 11)
sig2=0111 (decimal 7)

multiplying yields:

sig1×sig2=1001_101 (decimal 77)

The truncated 4-bit result is the four rightmost bits in the result—1101. The least significant bit of the truncated 4-bit result (the first digit—1) is labelled L, the next bit (1) is labelled G, and S is the logical OR of the remaining bits, i.e. S=(0|1)=1. To round, we adjust our 4-bit result (1001) according to the rounding mode and the computation in the table above. So for instance in RNA rounding, G is set so we increment by returning 1001+1=1010. For RX rounding G|S is true so we set L to 1 (it's already 1, so in this case nothing changes) and return 1001.

A faster way to do rounding is to inject a rounding constant as part of the significand addition. To see how this works, consider adding numbers in dollars and cents and then rounding to dollars. If we add $1.27+$2.35=$3.62

We see that the sum $3.62 is closer to $4 than to $3, so either of the round-to-nearest modes should return $4. If we represented the numbers in binary, we could achieve the same result using the L, G, S method previously described. But suppose we just add fifty cents and then truncate the result.

$1.27+$2.35+$0.50 (rounding injection)=$4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary floating-point this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode. For floating-point numbers, the rounding injection is one of three different values, values which depend on the rounding mode and (sometimes) the sign of the result.

Both RNA and RNE require us to inject a 1 at the G position (this is like adding $0.50 in the above dollars and cents example).

RP and RM rounding depends on the sign as well as the mode. RP rounds positive results up (towards positive infinity), but truncates negative results (again rounding toward positive infinity). Similarly RM rounds negative results up (toward negative infinity), but truncates positive results (again rounding toward negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in the dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

The floating-point conversion circuitry of the first aspect is physically distinct (e.g. separate) from the floating-point adder circuitry. As previously explained, it is common for the floating-point conversion circuitry to form part of the adder circuitry, since a conversion to a floating-point number of a particular format may often be required when performing an ADD operation on a floating-point number. However, the remainder of the floating-point adder circuitry is often large, and powering up the entire unit in order to perform a conversion is wasteful. By separating out the circuitry that performs a conversion, it is possible to provide an overall reduction in circuitry size. The plurality of different formats may comprise: an integer, a fixed-point number, and a floating-point number having a smaller format than said format of said output. The floating-point conversion circuitry therefore accepts at least these formats for any input. By accepting such a variety of different formats, the floating-point conversion circuitry can perform conversions without having to perform a conversion from an input to an intermediate format and then from the intermediate format to the output format.

The list of formats may include a subnormal floating-point number. Accordingly, it may be possible to perform a conversion on a greater range of inputs rather than requiring inputs to be formatted in a particular way before a conversion can be performed.

Although there may be several ways of normalising a subnormal floating-point number, in some embodiments, in response to the input being a subnormal floating-point number, a normalised significand may be produced by shifting an input a number of times such that the most significant bit is one.

The floating-point conversion circuitry may comprise one or more of inverter circuitry capable of inverting negative integer or fixed-point inputs; count leading zero circuitry capable of determining location of a leading 1 in the input; left shifter circuitry capable of normalizing the input; and integer adder circuitry for combining a shifted input, a rounding constant according to rounding mode, and a carry-in if the shifted input was inverted. Such circuitry may be used to perform a floating-point conversion using a small amount of circuit space. The use of a carry-in value in the integer adder circuitry means that the conversion from a negative number may be handled efficiently. In particular, one method of representing a negative integer number is to use two's complement representation. It is possible to convert between a number and its two's complement representation by taking the one's complement (i.e. inverting the zeroes and ones in the binary representation of the number) and adding one. A floating-point number does not use two's complement representation to represent a negative number. Hence, if the input to the floating-point conversion circuitry is in two's complement form, it may be necessary to convert the number to a sign-magnitude form. As already mentioned, this is done by taking the one's complement form and adding one. Since the integer adder circuitry may already add a rounding constant in order to achieve rounding, it is possible to delay adding the one until the rounding constant is added and to do both additions simultaneously by providing a carry-in value to the integer adder that performs the rounding addition. This saves an additional step in the process, and also saves having to provide a second adding unit to the apparatus.

The floating-point conversion circuitry may comprise rounding circuitry to round said normalised significand to produce a rounded significand by adding a rounding constant to said normalised significand. In particular, the rounding circuitry may perform injection rounding. Hence, rounding may be achieved without requiring any analysis of the number itself. The rounding process may therefore be achieved simply and quickly.

The rounding circuitry may be to generate the rounding constant in dependence on a rounding mode. A number of different rounding modes and their operation have already been discussed. By generating the rounding constant in dependence on the rounding mode, it may be possible to use the same circuitry to support a variety of different rounding modes.

The rounding circuitry may generate the rounding constant in dependence on whether or not said rounding mode is round to zero. Furthermore, the rounding circuitry may generate the rounding constant in dependence on whether or not the rounding mode is rounding up. Finally, the rounding constant may be generated in dependence on a format of the output. The rounding constant may vary depending on which (if any) of these rounding modes is used. The rounding constant may also vary depending on the format of the output. The format of the output may indicate the number of bits used to represent a number and/or how those bits are actually used.

As an example, the rounding circuitry may generate a rounding constant in dependence on: a first value, indicating if said output is a 32-bit floating-point number and if said rounding method is not rounding to zero; a second value indicating if said output is a 32-bit floating-point number and if said rounding method is rounding up; a third value indicating if said output is a 64-bit floating-point number and if said rounding method is not rounding to zero; and a fourth value indicating if said output is a 64-bit floating-point number and if said rounding method is rounding up. For example, the rounding constant may be a concatenation of these four values.

The rounding constant may be a 64-bit number. Accordingly, it may be possible to round both 32-bit and 64-bit inputs. In other embodiments, the rounding constant may be a 32-bit number.

In one example, the rounding circuitry may be to generate the rounding constant by outputting in order: a value 0 output 24 times; said first value; said second value output 28 times; a first result of performing a logical OR on said third value and said second value; a second result output 10 times, wherein said second result is of performing a logical OR on said fourth value and said second value.

The rounding circuitry may be to output a carry out value indicative of whether or not said addition of said rounding constant to said normalised significand produced an overflow. For example, the carry out value may indicate whether or not the addition of the rounding constant to the normalised significand was bigger than the biggest number that can be represented by the circuitry that performs the addition.

The floating-point conversion circuitry may comprise combining circuitry to combine a rounded significand, one of an exponent or an adjusted exponent, and a sign bit, in order to produce a floating-point number. In dependence on the existence of the carry out value (i.e. whether or not the result of the addition was larger than can be represented by the circuitry), the rounded significand may be combined with either the exponent or the adjusted exponent. For example, in some embodiments, the combining circuitry may combine the rounded significand with said exponent if said carry out value is indicative that no overflow occurred and may combine said rounded significand with said adjusted exponent if said carry out value is indicative that an overflow occurred.

The floating-point conversion circuitry may comprise significand construction circuitry to receive said input and to generate a normalised significand by using shifting circuitry to perform a shift on said input. Additionally, in response to the input being in two's complement format, the significand construction circuitry may be to generate the normalised significand by inverting the bits of the input. As previously discussed, in some embodiments, the full conversion from two's complement format to a natural representation may also involve the addition of a 1. This can be achieved by setting a value of the carry-in value to '1' in any later addition step.

The floating-point conversion circuitry may comprise exponent construction circuitry to receive said input and to provide an exponent in dependence on an exponent bias of a precision of said output, wherein in response to said input being a floating-point number, said exponent construction circuitry is to provide said exponent by adding said exponent bias of said precision of said output and an exponent of said input, and subtracting said number of times and an exponent bias of a precision of said input; wherein, in response to said exponent of said input being zero, said exponent construction circuitry is to adjust said exponent by adding one; and wherein, in response to said input not being a floating-point number, said exponent construction circuitry is to provide said exponent by adding said exponent bias of said precision of said output, a number of non-fraction bits of said input, said number of times and subtracting one.

In some embodiments, the significand construction circuitry may be to adjust the input so that the input has a predefined number of bits. This can be achieved through "padding". By adding less significant bits, the number can be made to have the correct (predefined) number of bits in total. For example, less significant bits may be added to a 32-bit number in order to produce a 64-bit number. Similarly, bits may be added to a 16-bit number in order to produce a 64-bit number. This modified 64-bit number may then become the input.

Figure 1:
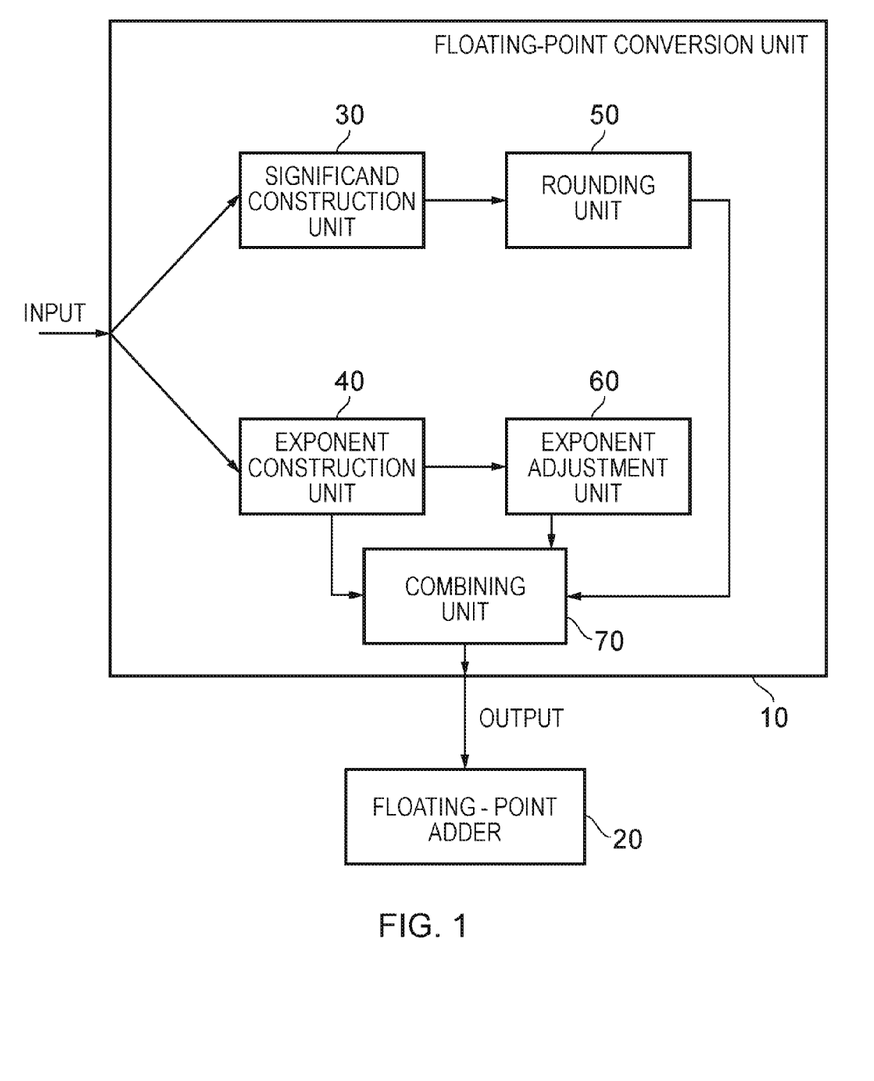
FIG. 1 is a diagram showing, schematically, the configuration of circuitry in accordance with one embodiment.

FIG. 1 shows, schematically, a configuration of circuitry in accordance with one embodiment. The floating-point conversion unit (also referred to as floating-point conversion circuitry) 10 receives an input having a particular format. The floating-point conversion unit converts the input in order to produce an output having a different format. This output may then be provided to, for example, a floating-point adder (also referred to here as floating-point adder circuitry) 20, which is physically separate from the floating-point conversion unit 10. Thus note that here, the floating-point conversion unit 10 and the floating-point adder 20 are embodied as components which are distinct from each other.

The floating-point conversion unit 10 receives the input, which is sent to the significand construction unit 30 and the exponent construction unit 40. The significand construction unit 30 receives the input and generates a normalised significand in a step 1a. As previously explained, the significand comprises the significant digits of the number being represented. In other words, the significand is the portion of the number excluding the exponent. The significand construction unit 30 produces a normalised significand. In other words, the output of the significand construction unit 30 contains the number 1 as the most significant digit. By normalising the significand and passing this value onto the rounding unit 50, the rounding unit 50 can operate on numbers having a similar format. Consequently, the rounding unit 50 does not have to deal with different inputs having a plurality of different formats.

In a step 2a, the rounding unit 50 performs rounding on the normalised significand produced by the significand construct unit 30, in order to produce a rounded normalised significand.

The input to the floating-point conversion unit 10 is also passed to the exponent construction unit 40. The exponent construction unit 40 may use one of two different formulae in order to determine what the exponent of the output number should be in a step 1b. Note that the significand construction unit 30 and the exponent construction unit 40 may each operate substantially in parallel. The output of the exponent construction unit 40 is passed to both the exponent adjustment unit 60 and the combining unit 70.

The exponent adjustment unit 60 receives the exponent that has been constructed from the exponent construction unit 40 and produces an adjusted exponent by adding 1 to this value in a step 2b. This resulting adjusted exponent is passed as an output to the combining unit 70. Note that the rounding unit 50 and the exponent adjustment unit 60 may each operate in parallel.

The combining unit 70 receives, as inputs, the exponent calculated by the exponent construction unit 40, the adjusted exponent calculated by the exponent adjustment unit 60, and the rounded normalised significand generated by the rounding unit 50. At least a part of the rounded normalised significand from the rounding unit 50 is combined with either the exponent from the exponent construction unit 40 or the adjusted exponent from the exponent adjustment unit 60 in order to produce the output, which is the converted number. The output from the combining unit 70 may be passed, for example, to the floating-point adder 20.

The floating-point conversion unit 10 is capable of converting from a variety of different formats and to a variety of different formats. In particular, the floating-point conversion unit 10 in the embodiment shown in FIG. 1 is capable of taking a 16-bit integer, a 32-bit integer, a 64-bit integer, a floating-point number, or a fixed-point number as an input. Integer input may be either signed or unsigned. When the input is a fixed-point number or an integer, the output may be any of the standard floating-point formats. When the input is a floating-point number, the output may be any larger format floating-point number (for example, a half precision or single precision floating-point number may be converted to a double precision number, or a half precision number may be converted to a single precision number). This may all be achieved using the same circuitry. The floating-point conversion unit 10 described herein has the advantage of being particularly small and fast relative to other proposed solutions. In particular, the latency of the floating-point conversion unit 10 may be as little as two cycles.

The processes performed by each of the significand construction unit 30, the exponent construction unit 40, the rounding unit 50, and the exponent adjustment unit 60 may be thought of as four different steps, some of which may be performed in parallel. In particular, the significand construction unit 30 may be said to carry out a process 1a and the exponent construction unit 40 may be said to perform a process 1b (it being understood that processes 1a and 1b are carried out in parallel), whilst the rounding unit 50 may be said to perform a process 2a, and the exponents adjustment unit 60 may be said to perform a process 2b (again, processes 2a and 2b being carried out in parallel). Note however that this distribution of steps is merely illustrative and while the embodiments described here may perform particular processes substantially or fully in parallel, in other embodiments, the processes may be performed sequentially, or may be parallelised in a different manner.

Figure 2:
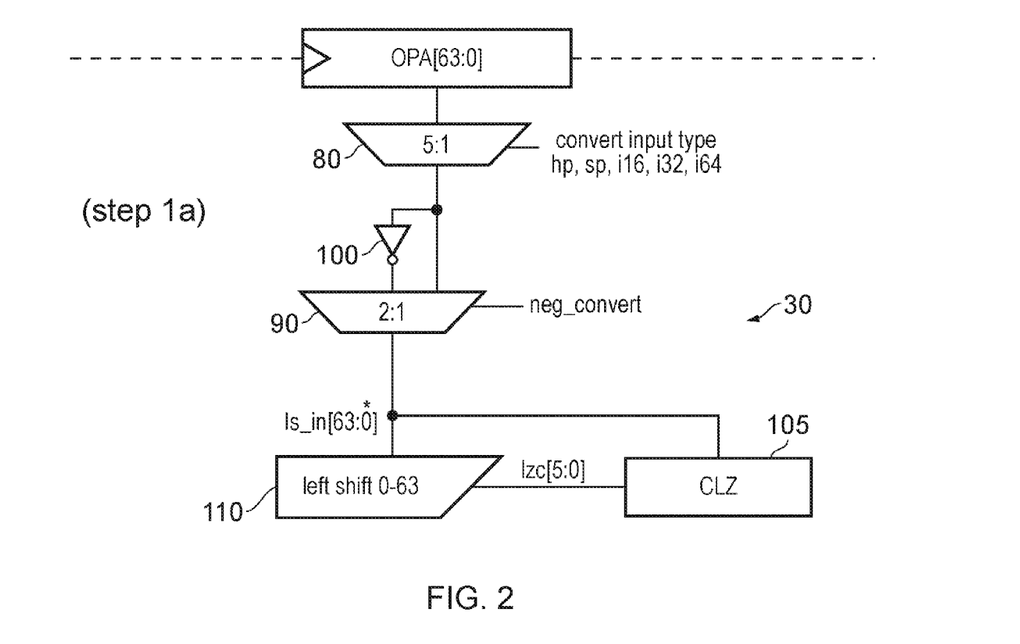
FIG. 2 is a diagram schematically showing circuitry suitable for normalising the significand of an input, in accordance with one embodiment.

FIG. 2 shows the significand construction unit 30 in accordance with one embodiment. As previously noted, the significand construction unit 30 may be said to perform a step 1a. In particular, the significand construction unit 30 is configured to generate a normalised significand from the input. The significand construction unit 30 comprises a multiplexer 80, which receives the input. The multiplexer 80 is configured to convert inputs so that they have a consistent format. In particular, the output of the multiplexer 80 will have 64 bits. This may be achieved by padding the input, which may have fewer than 64 bits. Additionally, the padding may take place at the least significant bits such that the bits of interest are all aligned. The different inputs accepted, and the manner in which the conversion takes place, is shown with reference to FIG. 3.

If the input to the significand construction unit 30 corresponds to a negative integer or negative fixed-point number, then the value of neg_convert is firstly set to 1 and multiplexer 90 is configured to select, as an output, an inverted version of the output of multiplexer 80. The inversion is achieved by inverter 100. In other words, if the input is in two's complement format then, using inverter 100, the one's complement is taken and output by multiplexer 90. Otherwise, the original form of the output of the multiplexer 80 is output by multiplexer 90. Additionally, the value neg_convert is output by the multiplexer 90 in order to indicate whether or not the input was in two's complement format or not. Accordingly, the output of multiplexer 90 is not in two's complement format. The resulting 64-bit value output by the multiplexer 90 is referred to as ls_in [63:0]. It will be appreciated that the conversion to a natural form is not entirely complete at this stage, since the conversion from two's complement format to natural format also requires the value 1 to be added. However, this addition is achieved at a later stage.

In the embodiment shown in FIG. 2, the number of leading zeroes is counted by a counter 105. The value is then sent to a left shifter 110 as value lzc[5:0] and the left shifter 110 left shifts the value output by the multiplexer 90 a number of times indicated by the value lzc[5:0]. In other words, the value output by the multiplexer 90 is left shifted until the most significant digit is equal to 1. It will be appreciated that in some embodiments, a specific counter such as counter 105 will not be necessary, since the number of leading zeroes may be provided by other circuitry in the system. For example, a decoding unit that decodes instructions may provide the number of leading zeroes to the left shifter 110.

The result of this process is a normalised significand, which is passed to the rounding unit 50.

Figure 3:
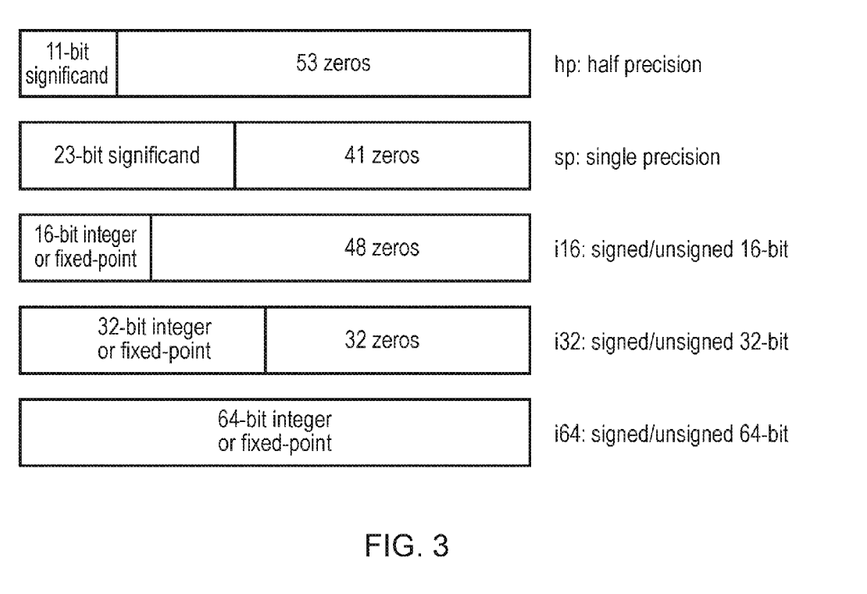
FIG. 3 is a diagram showing how various inputs may be adjusted in accordance with one embodiment.

FIG. 3 shows how, in one embodiment, an input may be converted by the multiplexer 80 to have a consistent format of 64 bits:

For a half precision integer, the 64-bit format number is made up of the 11 bits of the significand of the half precision input followed by 53 zeroes;

For a single precision number, the output is made up of the 23 bits of the significand of the input followed by 41 zeroes;

For a 16-bit signed or unsigned integer or fixed-point number, the output is made up of the 16-bit number followed by 48 zeroes;

For a 32-bit signed or unsigned integer or fixed-point number, the output is made up of the 32-bit number followed by 32 zeroes; and For a 64-bit signed or unsigned integer or fixed-point number, the input is directly output as the output.

As previously explained, the input is converted in one of these ways by the multiplexer 80, and the output is forwarded to the multiplexer 90 and inverter 100.

Figure 4:
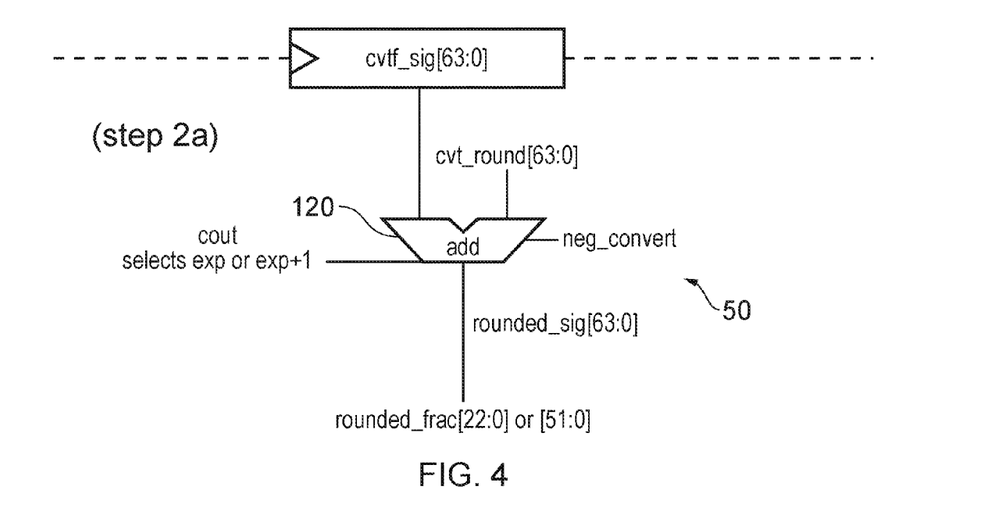
FIG. 4 is a diagram schematically showing circuitry suitable for rounding the normalised significand in accordance with one embodiment.

FIG. 4 shows the rounding unit 50 in accordance with one embodiment. In the embodiment shown in FIG. 4, the rounding unit comprises an integer adder 120. The integer adder receives as input the normalised significand output from the left shifter 110 of the significand construction unit 30, a rounding constant cvt_round [63:0], and the value neg_convert determined by the multiplexer 90 in the significand construction unit 30.

By providing the value neg_convert as a carry-in value to the integer adder 120, it is possible to convert an input that is in two's complement format. The initial step occurs using the multiplexer 90 in the significand construction unit 30, where the input is inverted. By performing the additional step of adding 1 at the integer adder 120 using the carry-in value, only a single integer adder is required. Note that if the input to the multiplexer 90 in the significand construction unit 30 is not in two's complement format, then the value neg_convert will be zero and consequently no carry-in value is provided in the integer adder 120 of the rounding unit 50.

The construction of the rounding constant cvt_round [63:0] is now discussed. In the embodiments shown in FIG. 4, the process of injection rounding is used in order to perform the rounding. Injection rounding is a technique in which rounding is achieved without analysing the number that is to be rounded. Instead, operations such as additions and truncations may be performed without analysis of the number itself. The rounding constant is generated according to a number of parameters. A first parameter indicates whether the output size is a single precision number (32-bit) or a double precision number (64-bit). A second parameter indicates whether or not the rounding mode rounds to zero. In other words, this parameter represents whether or not the rounding mode truncates the number to be rounded. A third parameter indicates whether or not the rounding mode rounds up. In other words, this parameter represents whether or not the rounding mode involves taking the ceiling of a number. Using these parameters, four different values can then be calculated. Each of these values is a single bit and are as follows:

sp_guard is 1 if the output is single precision and if the rounding mode is not rounding to zero; otherwise, the value is 0;

sp_ru is 1 if the output is single precision and if the rounding mode is rounding up; otherwise, the value is 0;

dp_guard is 1 if the output is double precision and if the rounding mode is not rounding to zero; otherwise, the value is 0; and dp_ru is 1 if the output is double precision and if the rounding mode is round up; otherwise, the value is 0.

A 64-bit rounding constant cvt_round [63:0] may then be generated by outputting 24 zeroes, followed by the value of sp_guard, followed by the value of sp_ru repeated 28 times, followed by the logical OR of the values dp_guard and sp_ru, followed by the logical OR of the values dp_ru and sp_ru repeated 10 times.

The result of adding the rounding constant cvt_round [63:0] to the normalised significand output by the left shifter 110 in the significand construction unit 30 is a normalised rounded significand (rounded_sig [63:0]). A further output of the integer adder 120 may be cout, which is a carry-out value in case the result of the addition performed by the integer adder 120 overflows. This value is used by the combining unit 70 in order to determine whether to use the exponent calculated by the exponent construction unit 40 or the adjusted exponent produced by the exponent adjustment unit 60.

Figure 5:
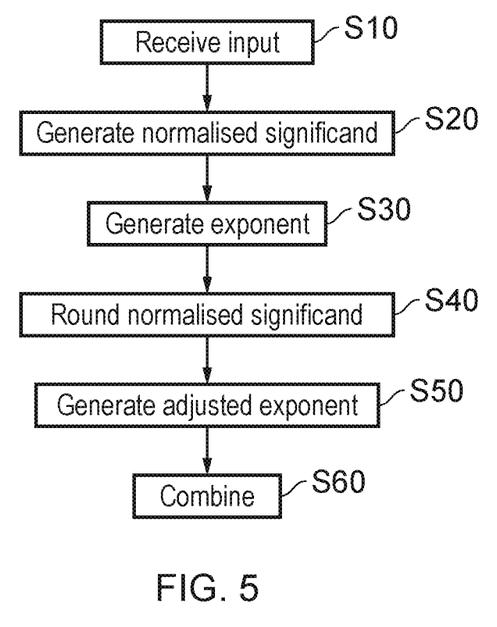
FIG. 5 is a flowchart illustrating a method for generating a floating-point number as an output by performing a conversion on an input, where the input may have a plurality of different formats, in accordance with one embodiment.

FIG. 5 shows a flow chart corresponding to a method of generating a floating-point number as an output by performing a conversion on an input in accordance with one embodiment.

At step S10, the input is received. Note that the input may have a variety of different formats including a half precision floating-point number, a single precision floating-point number, a 16-bit integer, a 32-bit integer, a 64-bit integer, a 16-bit fixed-point number, a 32-bit fixed-point number or a 64-bit fixed-point number. The input is used to generate a normalised significand at step S20 (corresponding to process 1a). This may be carried out using, for example, the significand construction unit 30 as illustrated in FIG. 2. At step S30 (corresponding to process 1b), an exponent is generated in dependence on the input. At step S40 (corresponding to process 2a), the normalised significand produced at step S20 is then rounded. This may be done, for example, using the rounding unit 50 as illustrated in FIG. 4. The step of rounding the normalised significand may use a number of different methods. However, in the embodiment described in FIG. 5, the rounding process uses injection rounding, which involves the addition of a rounding constant to the normalised significand. At step S50 (corresponding to process 2b), the exponent generated a step S30 is adjusted in order to generate an adjusted exponent. Finally, at step S60, at least a part of the normalised rounded significand produced at step S40 is combined with a signed bit, which indicates whether the output number is positive or negative, and one of the exponent generated at step S30, or the adjusted exponent generated at step S50 in order to produce the output value. This final step is discussed in more detail in FIG. 7.

Note that in the embodiment illustrated in FIG. 5, the series of steps is shown as being sequential. However, this is not a requirement. In other embodiments, the generation of the normalised significand at step S20 and the generation of the exponent at step S30 may occur in parallel. Similarly, the process of rounding the normalised significand at step S40 and the generation of the adjusted exponent at step S50 may occur in parallel. Alternatively, other parallelisations may be appropriate. Similarly, the parallelisation may be fully parallelised or may be substantially parallelised. In other words, the parallelisation may, in practice, involve some amount of interleaving or may involve the use of shared variables across processes that occur "in parallel".

Figure 6:
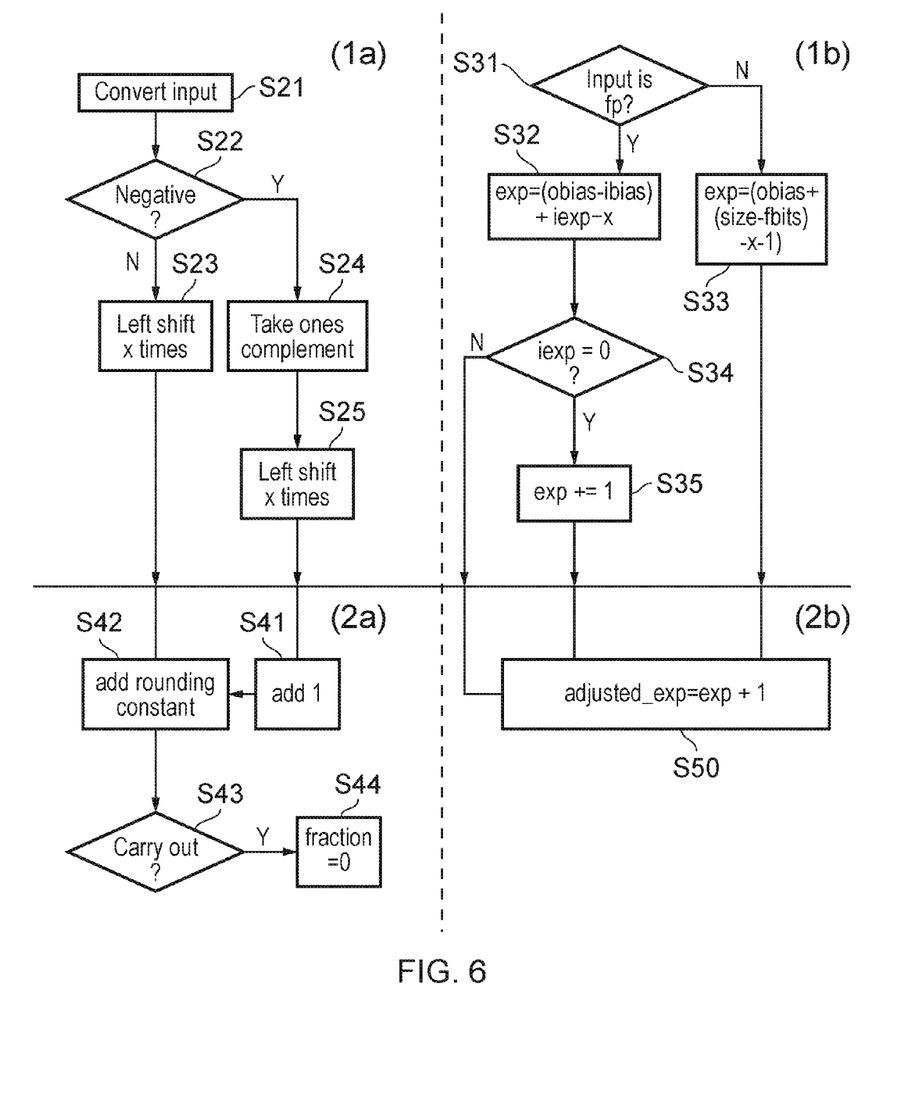
FIG. 6 is a flowchart illustrating the processes of normalising the significand of an input, generating an exponent, performing rounding on the normalised significand, and adjusting the exponent, in accordance with one embodiment.

FIG. 6 is a detailed flow chart illustrating the process of normalising the significand of an input, generating an exponent, performing rounding on the normalised significand, and adjusting the exponent, in accordance with one embodiment.

Process 1a corresponds to step S20 of FIG. 5. This process may also be performed by the significand construction unit 30, for example. At step S21, the input is converted. For example, the input may be padded in order to produce a 64-bit value, with the padding being added to the least significant bits in the form of additional zeroes. Such formatting is illustrated in detail in FIG. 3. At step S22, it is determined whether or not the converted input value is negative. For example, it can be determined whether or not the converted input is in two's complement format.

If the input is negative, then flow proceeds to step S24 where the one's complement of the number is taken. This can be achieved by inverting all of the bits of the number. The result of that process is then left shifted x times at step S25. Here, the value x represents the number of leading zeroes in the number. Accordingly, at step S25, the value is left shifted until the most significant digit is a one. In other words, the result of taking the one's complement is normalised. The flow then proceeds to step S41.

If, at step S22, the value of the converted input is not negative (i.e. it is positive or zero), then flow continues to step S23 where the input is left shifted x times. This left shifting occurs in the same manner as it does in step S25. Flow then proceeds to step S42.

Substantially simultaneously with process 1a, process 1b occurs. Process 1b corresponds to step S30 in FIG. 5 and involves the generation of the exponent. This may be carried out by, for example, the exponent construction unit 40 illustrated in FIG. 1.

At step S31, it is determined whether or not the input is a floating-point number. If the input is not a floating-point number, then flow proceeds to step S33. At step S33, the exponent is calculated using the formula:

(obias+size−fbits−x−1) where:

'obias' is the bias associated with the exponent of the number to the output. While an exponent can be positive or negative, it is typically represented as an unsigned number. Consequently, to determine the actual exponent from the represented exponent, it is necessary to subtract a bias. For example, the bias for a single precision number is 127. Accordingly, if the exponent is represented as the number 1, then the true exponent is −126 (i.e. 1−127). The bias of a half precision floating-point number is 15 and the bias of a double precision floating-point number is 1023.

'size' is the number of bits used to represent the input number.

'fbits' represents the number of bits used to represent the fraction in the input (if any). For example, a 32-bit fixed-point number with 3 fraction bits would have a value of 3. Alternatively, a 64-bit integer, which has no fraction would have a value of 0.

'x' is the number of leading zeroes in the input number.

Once the value of the output exponent has been calculated in this manner, flow proceeds to step S50. If at step S31, it is determined that the input is a floating-point number, then flow proceeds to step S32 where the output exponent is calculated using the formula:

(obias−ibias+iexp−x) where:

'obias' is the bias of the exponent of the output as previously discussed.

'ibias' is the bias of the exponent of the input number.

'iexp' is the value of the input exponent.

'x' is the number of leading zeroes in the input number.

Flow then proceeds to step S34 where it is determined whether or not the input exponent is zero. If the input exponent is zero then at step S35, the output exponent is incremented by 1. In either event, the flow then proceeds to step S50.

There are many different circuits that may be used to implement process 1b. However, since steps S32 and S33 are not needed simultaneously, by muxing the inputs, either step can be performed using a 3:2 carry-save adder followed by an 11-bit carry-propagate adder. Such an implementation avoids the need for additional, potentially complex circuitry and can allow process 1b to be performed using a small amount of circuit space (and therefore with a small amount of power).

Process 2b corresponds to step S50 in FIG. 5. It may be carried out, for example, using the rounding unit 50, an example of which is shown in FIG. 4.

Process 2a may begin at step S41, if at the previous step S22 the input was found to be negative. At step S41, the value 1 is added to the significand and the flow proceeds to step S42.

Process 2a may also begin directly at step s42 if, at step S22, it was determined that the input was not negative. At step S42, a rounding constant is added. Note that steps S41 and S42 may be performed using an integer adder that takes a value neg_convert as a carry-in value, which is set to 1 in the event that the input was negative and 0 otherwise. Such circuitry is illustrated with reference to the embodiments shown in FIG. 4. An advantage of using an integer adder for this process is that an integer adder is particularly small. Accordingly, the rounding can be performed using a small amount of circuitry and so the power consumption of the circuit is comparatively small. At step S43, it is determined whether or not the result of adding the rounding constant (and the constant 1 if appropriate) resulted in a carry-out value being generated. In other words, it is determined whether or not the result of adding the rounding constant produced an overflow. If a carry-out value was generated as step S43, then flow proceeds to step S44 where the output fraction is set to zero.

Process 2b corresponds to step S50 as shown in FIG. 5. Process 2b may also be carried out, for example, using the exponent adjustment unit 60 illustrated in FIG. 1.

The exponent adjustment unit generates an adjusted exponent by taking the exponent generated in process 1b and adding 1.

Note that processes 2a and 2b may be performed in parallel.

Figure 7:
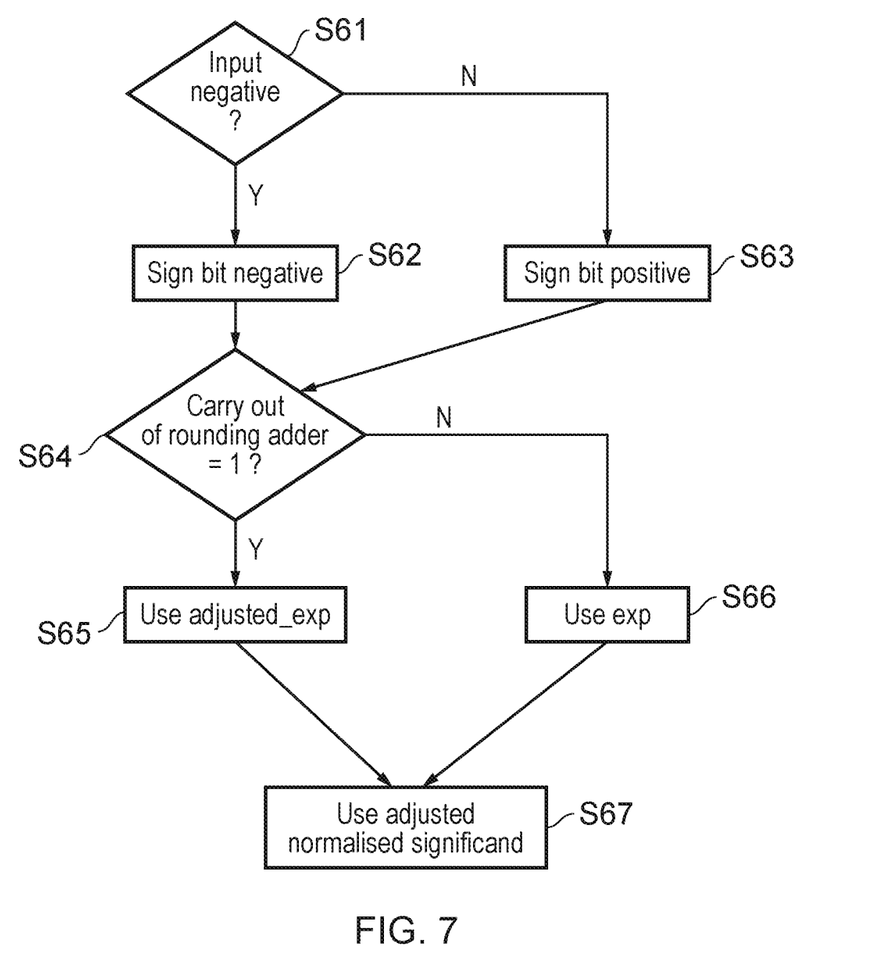
FIG. 7 is a flowchart illustrating the process of combining different values generated from an input in order to produce a converted output, in accordance with one embodiment.

FIG. 7 is a flow chart illustrating how the combining unit 70 may combine the results of the rounding unit 50, and one of the exponent construction unit 40 and the exponent adjustment unit 60. This combining unit 70 performs the combining step S60 shown in FIG. 5.

At step S61, it is determined whether or the input is negative. If the input is negative then at step S62 the signed bit used in the output is also set to being negative. Otherwise at step S63, the signed bit of the output is set to being positive. In either event, flow then proceeds to step S64 where it is determined whether or not the carryout of the rounding adder, for example integer adder 120, is 1. If the carry-out value is not 1 then at step S66, the exponent of the output is as generated in process 1b. If the carry-out of the rounding adder is equal to 1, then at step S65, the exponent of the output is equal to the adjusted exponent calculated at step S50. In either event, flow proceeds to step S67 where at least a part of the rounded normalised significand is used as the fraction component. In particular, if a single precision output is desired then the upper 24 bits of the rounded normalised significand are used. However, if a double precision output is desired then the upper 53 bits are used.

The output is therefore made up of the signed bit, the exponent or adjusted exponent, and the adjusted normalised significand produced as a result of process 2a and output by the rounding unit 50.

Accordingly, as the result of using the aforementioned circuitry, it is possible to convert from numerous different input formats using the same circuitry in a time and space efficient manner.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   floating-point adder circuitry; and
   floating-point conversion circuitry to generate a floating-point number as an output by performing a conversion on any input having a format from a list of formats including: an integer number, a fixed-point number, and a floating-point number having a format smaller than said output floating-point number,
   wherein said floating-point conversion circuitry is physically distinct from said floating-point adder circuitry,
   wherein said floating-point conversion circuitry comprises:
   significand construction circuitry to receive said input and to generate a normalised significand by using shifting circuitry to perform a shift on said input; and
   said significand construction circuitry to generate said normalised significand by inverting said bits of said input in response to said input being in two's complement format.

2. A data processing apparatus according to claim 1 wherein said list of formats includes: a subnormal floating-point number.

3. A data processing apparatus as claimed in claim 1,
   said floating-point conversion circuitry is capable of generating a normalised significand by shifting said input a number of times such that a most significant bit is one in response to said input being a subnormal floating-point number.

4. A data processing apparatus according to claim 1, wherein said floating-point conversion circuitry comprises one or more of:
   inverter circuitry capable of inverting negative integer or fixed-point inputs;
   count leading zero circuitry capable of counting leading zeroes in said input in order to determine a location of a leading 1 in said input;
   left shifter circuitry capable of shifting said input in order to normalize said input; and
   integer adder circuitry for combining a shifted input, a rounding constant according to rounding mode, and a carry-in if said shifted input was inverted.

5. A data processing apparatus as claimed in claim 1, wherein said floating-point conversion circuitry comprises:
   exponent construction circuitry to receive said input and to provide an exponent in dependence on an exponent bias of a precision of said output,
   said exponent construction circuitry to provide said exponent by adding said exponent bias of said precision of said output and an exponent of said input, and subtracting said number of times and an exponent bias of a precision of said input, in response to said input being a floating-point number;
   said exponent construction circuitry to adjust said exponent by adding one in response to said exponent of said input being zero; and
   said exponent construction circuitry to provide said exponent by adding said exponent bias of said precision of said output, a number of non-fraction bits of said input, said number of times and subtracting one in response to said input not being a floating-point number.

6. A data processing apparatus as claimed in claim 1,
   said significand construction circuitry to adjust said input such that said input has a predefined number of bits.

7. A data processing apparatus comprising:
   floating-point adder circuitry; and
   floating-point conversion circuitry to generate a floating-point number as an output by performing a conversion on any input having a format from a list of formats including: an integer number, a fixed-point number, and a floating-point number having a format smaller than said output floating-point number,
   wherein said floating-point conversion circuitry is physically distinct from said floating-point adder circuitry,
   wherein said floating-point conversion circuitry comprises:
   rounding circuitry to round a normalised significand to produce a rounded significand by adding a rounding constant to said normalised significand.

8. A data processing apparatus according to claim 7,
   said rounding circuitry to generate said rounding constant in dependence on a rounding mode.

9. A data processing apparatus according to claim 8,
   said rounding circuitry to generate said rounding constant in dependence on whether or not said rounding mode is round to zero;
   said rounding circuitry to generate said rounding constant in dependence on whether or not said rounding mode is rounding up; and
   said rounding circuitry to generate said rounding constant in dependence on a format of said output.

10. A data processing apparatus according to claim 8,
    said rounding circuitry to generate said rounding constant in dependence on:
    a first value indicating if said output is a 32-bit floating-point number and if said rounding method is not rounding to zero;
    a second value indicating if said output is a 32-bit floating-point number and if said rounding method is rounding up;
    a third value indicating if said output is a 64-bit floating-point number and if said rounding method is not rounding to zero; and
    a fourth value indicating if said output is a 64-bit floating-point number and if said rounding method is rounding up.

11. A data processing apparatus according to claim 10,
    said rounding circuitry to generate said rounding constant by outputting in order:
    a value 0 output 24 times;
    said first value;

said second value output 28 times;
a first result of performing a logical OR on said third value and said second value;
a second result output 10 times, wherein said second result is of performing a logical OR on said fourth value and said second value.

12. A data processing apparatus according to claim 7, wherein said rounding constant is a 64-bit number.

13. A data processing apparatus as claimed in claim 7, said rounding circuitry to output a carry out value indicative of whether or not said addition of said rounding constant to said normalised significand produced an overflow.

14. A data processing apparatus as claimed in claim 13, wherein said floating-point conversion circuitry comprises:
combining circuitry to combine a rounded significand, one of an exponent or an adjusted exponent, and a sign bit to produce said floating-point number.

15. A data processing apparatus as claimed in claim 14, said combining circuitry to combine said rounded significand with said exponent if said carry out value is indicative that no overflow occurred; and said combining circuitry to combine said rounded significand with said adjusted exponent if said carry out value is indicative that an overflow occurred.

16. A method of operating a data processing apparatus comprising floating-point adder circuitry and floating-point conversion circuitry, wherein said floating-point conversion circuitry is physically distinct from said floating-point adder circuitry, said method comprising the steps, performed by the data processing apparatus, of:
receiving any input having a format from a list of formats including: an integer number, a fixed-point number, and a floating-point number having a format smaller than said output floating-point number; and
generating a floating-point number as an output by performing a conversion on the input,
wherein said floating-point conversion circuitry performs the steps of:
receiving said input and generating a normalised significand by using shifting circuitry to perform a shift on said input; and
generating said normalised significand by inverting said bits of said input in response to said input being in two's complement format.

* * * * *